M. CZYZOWICZ AND J. SZUMILAS.
RED BEET GATHERER.
APPLICATION FILED DEC. 17, 1919.

1,377,468.

Patented May 10, 1921.
4 SHEETS—SHEET 1.

Inventors
M. Czyzowicz
J. Szumilas

By N. M. Wilson
Attorney

M. CZYZOWICZ AND J. SZUMILAS.
RED BEET GATHERER.
APPLICATION FILED DEC. 17, 1919.

1,377,468.

Patented May 10, 1921.
4 SHEETS—SHEET 4.

Inventors
M. Czyzowicz
J. Szumilas

By A. M. Wilson
Attorney

UNITED STATES PATENT OFFICE.

MICHAL CZYZOWICZ AND JAN SZUMILAS, OF CHICAGO, ILLINOIS.

RED-BEET GATHERER.

1,377,468.　　　　　　　Specification of Letters Patent.　　Patented May 10, 1921.

Application filed December 17, 1919. Serial No. 345,511.

*To all whom it may concern:*

Be it known that we, MICHAL CZYZOWICZ and JAN SZUMILAS, citizens of Poland, residing at Chicago, in the county of Cook and State of Illinois, have invented certain new and useful Improvements in Red-Beet Gatherers, of which the following is a specification.

The primary object of the present invention is the provision of an implement especially serviceable in the sugar beet business for pulling as well as conveying the beets, a beet-topper being also included in the structure.

A further object of the invention is the provision of a vehicle adapted for topping and pulling beets as well as conveying the same to a suitable point during the forward travel of the vehicle.

A still further object of the invention is the provision of a topping, pulling and conveying means for beets whereby the growing vegetables are expeditiously placed in a trailer when the device is propelled across a beet-field, the trailer being readily replaced by an empty trailer when filled for continuing the topping, pulling and loading operation.

With these general objects in view and others that will appear as the nature of the invention is better understood, the same consists in the novel construction, combination, and arrangement of parts hereinafter more fully described, illustrated in the accompanying drawings, and pointed out in the appended claims.

Figure 1:
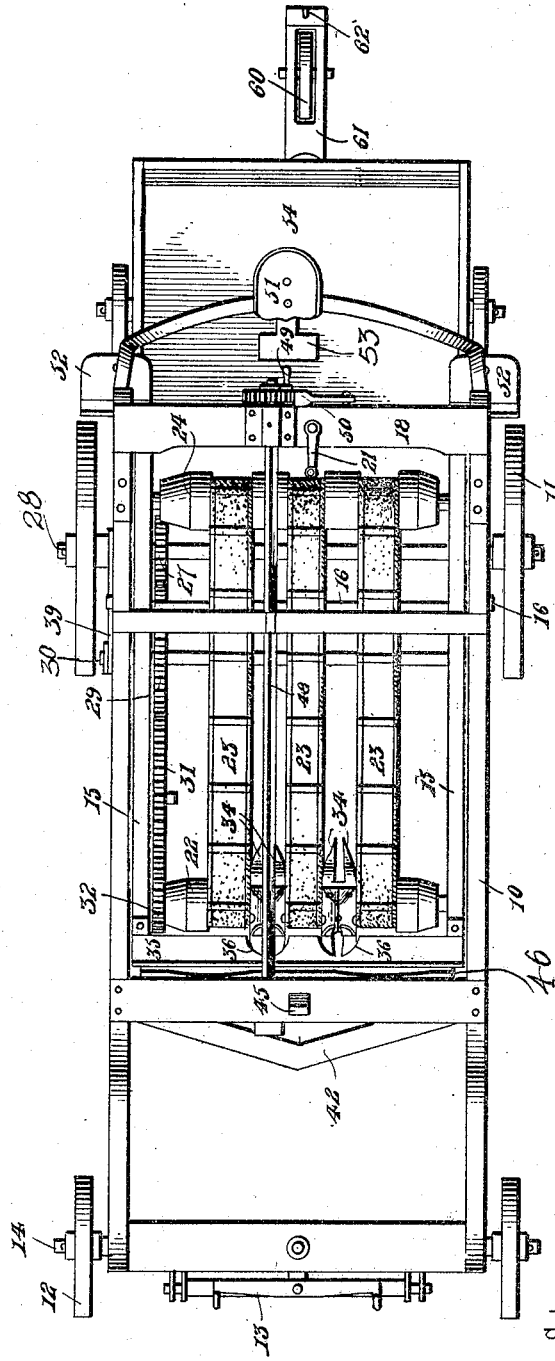
Figure 2:
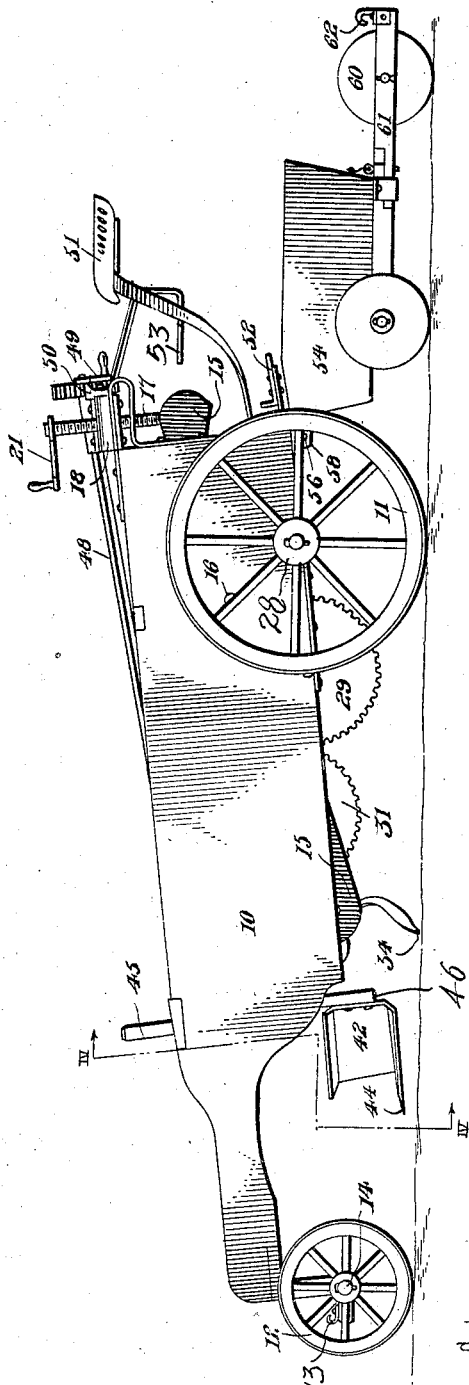
Figure 3:
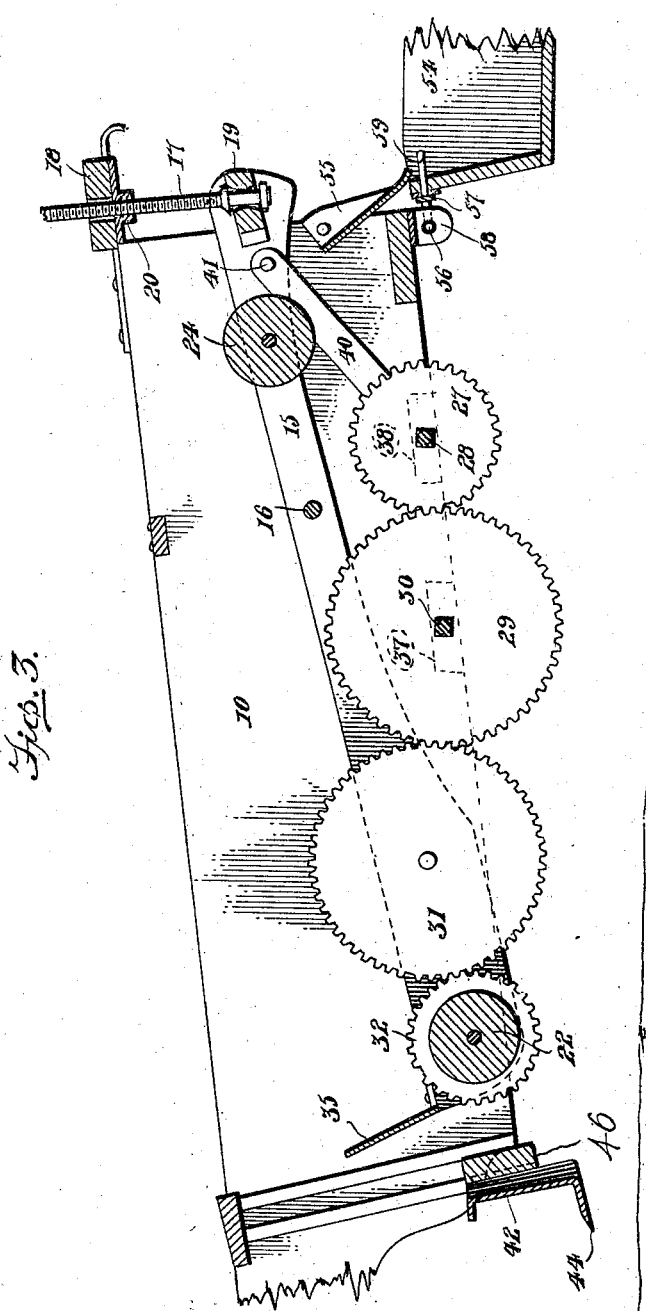
Figure 4:
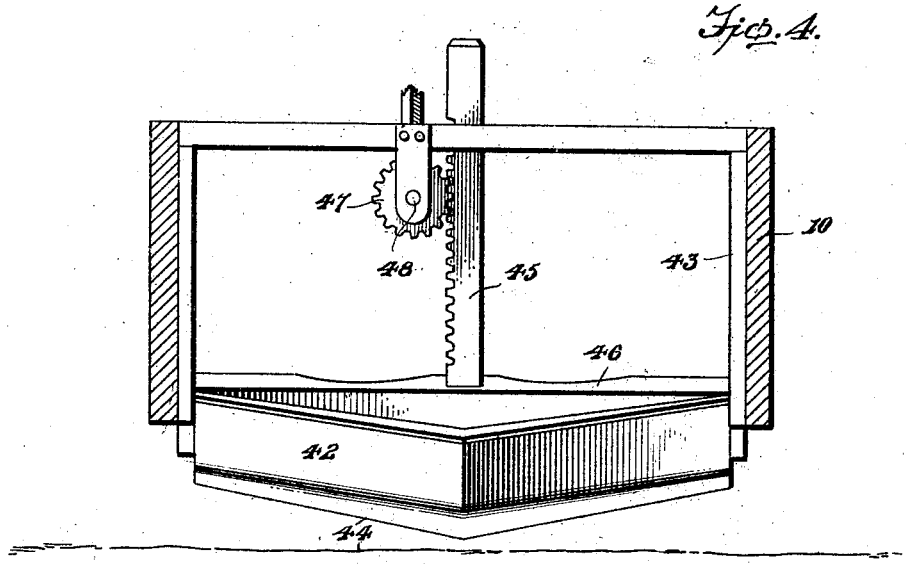
Figure 5:
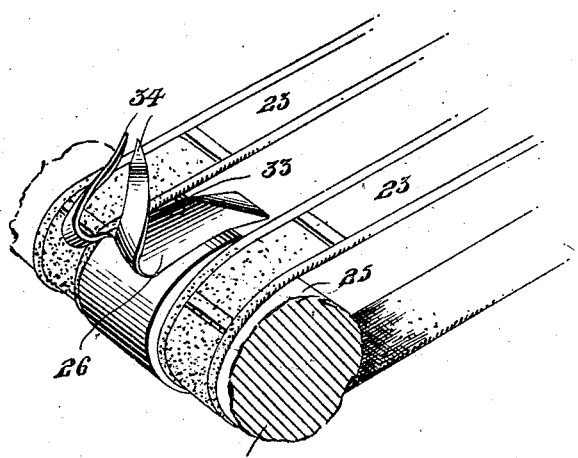
Figure 6:
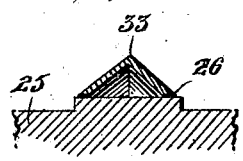

In the drawings forming a part of this application, and in which like designating characters refer to corresponding parts throughout the several views, Figure 1 is a top plan view of the invention, Fig. 2 is a side elevation thereof, Fig. 3 is a central longitudinal vertical sectional view of the same, Fig. 4 is a vertical transverse sectional view taken upon line IV—IV of Fig. 2, Fig. 5 is a perspective view of a forward portion of the conveyer illustrating the form of beet puller employed and Fig. 6 is a detail transverse view through one of the beet pulling members.

Our invention broadly consists of a vehicle having a skeleton body 10 mounted upon rear wheels 11 and forward wheels 12, the vehicle being adapted for forward movement by tractor means or draft animals not shown, adapted to be attached to a draft connection 13, carried by the steering axle 14 of the front wheels 12.

A rectangular frame 15 longitudinally arranged within the body 10 is swingingly mounted on the body by means of a transverse shaft 16. A bolt 17 extends through a transverse beam 18 at the rear of the body 10 swivelly connected at its lower end to the rear transverse end 19 of the frame 15, while the bolt 17 being threaded through a plate 20 beneath the beam 18 is readily turned by a crank 21 for shifting the frame 15 upon its pivot.

A roller 22 journaled forwardly within the frame 15 has a plurality of conveyer belts 23 passing thereover and also over a similar roller 24 journaled adjacent the rear end of the frame 15. The belts 23 are positioned upon reduced portions 25 of the rollers 22 and 24 while beet gatherers 26 are positioned upon intermediate portions of the forward roller 22 between said belts 23.

A gear 27 secured to the revolving axle 28 of the rear wheels 11 is in constant mesh with an idler gear 29 carried by a transverse shaft 30 attached to the side of the body 10 while the gear 29 meshes with a similar gear 31 journaled to the adjacent side of the frame 15. A gear 32 upon the forward roller 22 is in constant mesh with the gear 31 whereby the forward travel of the vehicle and the turning of the rear wheels 11 causes the roller 22 to revolve for operating the conveyer belts 23 and rear roller 24 as well as the beet gatherers 26.

The beet gatherers 26 are preferably formed as best illustrated in Fig. 5 of the drawings, with triangular body portions 33 by means of which they are secured to the roller 22 between the belts 23 and with outwardly projecting prongs 34 for engaging into the ground and digging up the beets during the rotation of the roller 22. A guard 35 upon the forward end of the frame 15 has suitable openings 36 permitting the beet gatherers 26 to pass therethrough it being understood that the gatherers 26 pass rearwardly and downwardly for engaging the beet positioned in the ground then carrying the beet upwardly upon the prongs 34 and permitting the beet to fall laterally upon one of the adjacent belts 23 by reason of the triangular formation of the body portion 33 of the gatherer as shown in Fig. 6. By turning the crank handle 21, the bolt 17 is operated for tilting the frame 15 to bring the gatherers 26 for engaging the prongs 34 the desired distance below the surface of the ground or elevating the prongs entirely above the ground when the device is not in use and as illustrated in Fig. 2.

The shaft 30 and axle 28 are slightly shiftable relatively of the body 10 at their ends adjacent the gears 29 and 27 respectively in slots 37 and 38 through which the adjacent ends of the shaft 30 and axle 28 are mounted. The adjacent outer end of the shaft 30 is connected by a link 39 with the axle 28 while the axle 28 is connected by a link 40 with the adjacent side of the frame 15, as at 41. By this arrangement the gears 27 and 29 will be maintained in constant mesh during the shifting of the frame 15 upon its pivot 11. A beet topper 42 in the form of a plow is vertically adjustable in guides 43 at opposite sides of the body 10 forwardly of the guard 35 and having its lower edge 44 adapted for severing the tops of the beets during the travel of the vehicle over the field. The beet tops will be thrown to either side by the plow 42 out of the way of the gatherers 26. A rack 45 carried by the rear beam 46 of the plow 42 is vertically adjustable by means of a pinion 47 meshing therewith and mounted upon a shaft 48 extending rearwardly of the body 10 with an adjusting crank 49 adjacent the adjusting crank 21 heretofore described. A pawl 50 is preferably provided for the shaft 48 and it will be apparent that the driver of the vehicle seated upon the seat 51 may readily turn the crank 49 for vertically adjusting the topper or plow 42 as may be found desirable, while the crank 21 is readily accessible for tilting the frame 15.

Opposite steps 52 are provided for access to the seat 51 which also has a suitable foot-rest 53. A three-wheeled trailer 54 is detachably connected to the rear of the vehicle body 10 for receiving the beets from the conveyer belts 23, which pass downwardly from the belt over an apron 55, into the box or body of the trailer.

Bolts 56 are carried by a bar 57, upon the trailer 54, for detachable connection with perforated lugs 58 depending from the rear end of the vehicle body 10 while a lever 59 within the trailer body is adapted for shifting the bar 57, for engaging or disengaging the bolts 56 at will. The trailer 57 is normally coupled to the vehicle body 10 during the beet-gathering operation for ready detachment for the purpose of attaching an empty trailer in succession as one trailer is filled.

One wheel 60 of the trailer 54 is carried by a pivoted tongue 61 having a draft connection 62 by means of which the trailer may be pulled to any desired location after being filled and detached from the vehicle body 10 by operating the lever 59.

The complete operation of the invention will be understood from these detailed descriptions thereof, the operator upon the seat 51, being able to manipulate the entire device, it being only necessary to descend to the ground for exchanging the trailers 54 or this operation may be accomplished by a second attendant having charge of hauling the filled trailers away from the field. The sugar beets are easily and quickly gathered in this manner and while the form of the invention herein shown and described, is believed to be the preferable embodiment thereof, it is nevertheless to be understood that minor changes may be made in the same without departing from the spirit and scope of the invention as claimed.

What we claim as new and desire to secure by Letters Patent is:—

1. A harvester comprising a wheeled vehicle, a frame pivoted within the body of the vehicle, a roller journaled within the frame, gear connections between the roller and the rear wheels of the vehicle whereby the roller is revolved during the travel of the vehicle, sets of beet pullers mounted in spaced relations upon the roller and a receiving belt running over the roller at opposite sides of the pullers adapted for receiving the beets for conveying the same rearwardly of the vehicle.

2. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions and beet diggers supported on one of the rollers intermediately of the reduced annular portions.

3. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions and beet diggers supported on one of the rollers intermediately of the reduced annular portions, said beet diggers having a mounting body portion triangular in cross section.

4. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions, beet diggers supported on one of the rollers intermediately of the reduced annular portions, said beet diggers having a mounting body portion triangular in cross section, and spaced prongs carried by the body portion and projecting outwardly of the adjacent roller.

5. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions and means supported on one of the rollers intermediately of the conveyers and projecting outwardly therefrom for digging beets and transferring the same to the conveyers.

6. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions and means supported on one of the rollers intermediately of the conveyers and projecting outwardly therefrom for digging beets and transferring the same to the conveyers, the base portions of said beet digging means being constructed to cause a lateral throw of the gathered beets to either side thereof.

7. A beet gatherer comprising a vehicle, an adjustable frame supported thereon, a roller journaled adjacent each end of the frame, driving connections between one roller and the vehicle wheels, said roller having spaced reduced annular portions, endless conveyers mounted in said portions, means supported on one of the rollers intermediately of the conveyers and projecting outwardly therefrom for digging beets and transferring the same to the conveyers, the base portions of said beet digging means being constructed to cause a lateral throw of the gathered beets to either side thereof and a plate supported on said frame and having openings therein through which the beet digging means are adapted to pass to remove the dirt from the beets.

In testimony whereof we affix our signatures.

MICHAL CZYZOWICZ.
JAN SZUMILAS.